(12) United States Patent
Wilcox et al.

(10) Patent No.: US 10,394,980 B2
(45) Date of Patent: Aug. 27, 2019

(54) METHOD FOR GENERATING A SIMULATION-MODEL

(71) Applicant: HEXAGON TECHNOLOGY CENTER GMBH, Heerbrugg (CH)

(72) Inventors: William Wilcox, New York City, NY (US); Derek Peeling, Burlington (CA)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 175 days.

(21) Appl. No.: 15/472,115

(22) Filed: Mar. 28, 2017

(65) Prior Publication Data

US 2018/0285500 A1 Oct. 4, 2018

(51) Int. Cl.
*G06F 17/50* (2006.01)
*G06T 19/20* (2011.01)

(52) U.S. Cl.
CPC ...... *G06F 17/5018* (2013.01); *G06F 17/5009* (2013.01); *G06T 19/20* (2013.01); *G06F 2217/16* (2013.01); *G06T 2210/56* (2013.01); *G06T 2219/2021* (2013.01)

(58) Field of Classification Search
CPC .................................. G06T 19/20; G06F 17/50
USPC .............. 703/2, 5, 13; 345/419; 700/97, 145
See application file for complete search history.

(56) References Cited

U.S. PATENT DOCUMENTS

| | | | | |
|---|---|---|---|---|
| 5,553,206 A * | 9/1996 | Meshkat | .................. | G06T 17/20 345/419 |
| 7,870,792 B2 * | 1/2011 | Kubli | .................. | G06F 17/5009 73/826 |
| 8,280,708 B2 * | 10/2012 | Kubli | .................. | G05B 19/4069 700/98 |
| 8,463,583 B2 * | 6/2013 | Kubli | ..................... | G06F 17/50 700/118 |
| 8,560,103 B2 * | 10/2013 | Kubli | ..................... | B21D 22/20 700/104 |
| 2006/0287755 A1 * | 12/2006 | Kubli | .................. | G05B 19/4069 700/145 |
| 2007/0208443 A1 * | 9/2007 | Caprioli | ............. | G06F 17/5018 700/97 |
| 2008/0004850 A1 * | 1/2008 | Wang | .................. | G06F 17/5018 703/13 |

(Continued)

OTHER PUBLICATIONS

Quinsat et al., Filling holes in digitized point cloud using a morphing-based approach to preserve volume characteristics, The International Journal of Advanced Manufacturing Technology, vol. 81, No. 1, May 9, 2015, pp. 411-421.

(Continued)

*Primary Examiner* — Thai Q Phan
(74) *Attorney, Agent, or Firm* — Maschoff Brennan

(57) ABSTRACT

A method for generating a simulation-model corresponding to an actual produced part, comprising based on a target Computer Aided Design (CAD)-model, producing an actual produced part, providing a target simulation-model corresponding to the target Computer Aided Design (CAD)-model, based on a measurement of the actual produced part, generating a numerical representation of the actual produced part, generating an actual simulation-model by modifying the target simulation-model such that the shape of the target simulation-model adapts to the numerical representation of the actual produced part.

15 Claims, 4 Drawing Sheets

(56) References Cited

U.S. PATENT DOCUMENTS

2012/0123579 A1* 5/2012 Kubli .................. B21D 22/20
   700/104
2012/0123741 A1* 5/2012 Kubli .................. G06F 17/50
   703/1
2015/0339851 A1 11/2015 Date et al.

OTHER PUBLICATIONS

Schweinoch et al., A non-rigid registration method for the efficient analysis of shape deviations in production engineering applications, Production Engineering, vol. 10, No. 2, Jan. 30, 2016, pp. 137-146.
European Search Report for corresponding application No. EP 18162137, dated Jul. 5, 2018.

* cited by examiner

METHOD FOR GENERATING A SIMULATION-MODEL

FIELD OF THE INVENTION

The present invention relates to a method and a computer programme product for a simulation-model corresponding to an actual produced part using a target Computer Aided Design (CAD)-model.

BACKGROUND

Numerical simulations, also referred to as numerical analyses, are used in a wide field of different applications. In such analyses, at least one of elastic and plastic deformations of a part is simulated when the part is exposed to a load. The simulation results are e.g. used for the purpose of designing a tool required for forming a part having a desired shape, or for the purpose of inspecting a part with regard to its material behaviour under various levels of stress (e.g. for testing assembly of a part, or for testing crashworthiness of a part).

Examples for such numerical simulations are Finite Element Analysis (FEA) using meshed models, or other structural analyses using meshfree models.

With regard to the simulation of a defined forming process, when knowing the structure of the workpiece (raw part), the structure of the target formed part, the structure of a tool being used in the forming process, and the physical properties of the used material, a numerical simulation can validate whether the tool has the correct design required for arriving at the target formed part.

With regard to the simulation of a load inspection, a numerical simulation can analyse and check compliance to deviation tolerances of a part or subassembly when exposed to a specific load with a defined amount, defined direction, and a defined point of application.

In both exemplary cases, the according simulation creates flawed results which can be minimised with the involvement of a simulation-model which represents an actual produced part rather than a simulation-model which represents the target produced part.

While it is generally known to use such simulation-models basing on an as-built part, the way they are generated results in imperfect models. This is the case because measurement data of the as-built part are used as basis for the simulation-model. Since measurement data are mostly not coherent and/or consistent, they render an incompatible basis for generating a simulation-model so that these directly created models are very different in organisation and structure compared to the meshes generated by numerical simulation software from a CAD-model. In particular, said models generated based on the numerical representation may be noisy and may have missing areas of the surface that were missed in the measurement process.

The present invention therefore proposes an improved way to generate simulation-model which represents an actual manufactured part. Simulation-models generated by the method according to the invention are more complete and more "clean", and therefore more suitable for numerical simulations, which therefore provide improved results.

A simulation-model generated by the inventive method may be used with any numerical simulation, such as a Finite Element Analysis or other structural analyses which simulate the deformation of featured parts and assemblies. Said numerical simulation may use meshed models (as they are used in FE-analysis) or unmeshed models (as they are used in new simulation approaches).

In order to provide an actual simulation-model, which represents the part as it has been actually formed, a target simulation-model of a (desired) target formed part is modified to confirm with a numerical representation (e.g. a measured point cloud) of the actual part. In particular, a simulation-model of the actual part may be achieved by matching and/or fitting the smooth and complete simulation-model of the desired part (generated by numerical analysis software) to the measured data representing the actual produced part.

An electronic representation of the actual part is, or is based on, a point cloud or a mesh captured from one of the many surveying sensors known in the art, e.g. white light scanners, blue light scanners, Coordinate Measuring Machines (CMM), 3D laser scanners, ultrasonic thickness tester, or Computer Tomography based scanning devices. Rather than trying to convert this point cloud or mesh of the actual part into a mesh that is compatible with numerical software, a model generated from the theoretical CAD-model of the target part is reshaped to match the point cloud. This results in a cleaner and more complete mesh.

For example, a clean Finite Element-mesh of an actual part is created by
  measuring the as-built part with one of many measurement methods to generate a three-dimensional numerical representation of the as-built part;
  providing or generating a clean simulation-model optimised for a numerical simulation software of the target part (e.g. derived from the CAD-model of the target produced part);
  fitting this clean target FE-mesh onto the point cloud or mesh; this may include taking into account the errors both perpendicular to the part surfaces and also parallel to it; by this modification of the target simulation-model, an "actual" simulation-model is generated as it corresponds to the actual produced part;

Several three-dimensional numerical representations or several actual simulation-models may hereby be averaged in order to achieve more statistical robustness.

SUMMARY

The invention relates to a method for generating a simulation-model corresponding to an actual produced part, comprising based on a target Computer Aided Design (CAD)-model, producing an actual produced part, providing a target simulation-model corresponding to the target Computer Aided Design (CAD)-model, based on a measurement of the actual produced part, generating a numerical representation of the actual produced part, generating an actual simulation-model by modifying the target simulation-model such that the shape of the target simulation-model adapts to the numerical representation of the actual produced part. The target CAD-model corresponding to the target produced part may be generated at first within the method.

The numerical representation of the actual produced part may be a three-dimensional point cloud or a three-dimensional model based on a point cloud.

Generating the numerical representation of the actual produced part may comprise adding, removing, or reversing effects of gravity which the actual produced part is exposed to during the measurement.

Generating the actual simulation-model may comprise matching the target simulation-model with the numerical representation of the actual produced part by minimising deviations between the target simulation-model and the numerical representation of the actual produced part.

Minimising the deviations may be based on the least squares method.

The target simulation-model may e.g. be a Finite Element (FE)-mesh comprising a set of vertices, and generating the actual simulation-model may comprise fitting the vertices of the target simulation-model such that every vertex lays within the numerical representation of the actual produced part.

Generating the actual simulation-model may comprise fitting the target simulation-model such that it becomes congruent with the numerical representation of the actual produced part.

Generating the actual simulation-model may comprise smoothing the fitted target simulation-model based on interpolations.

The invention also relates to a computer programme product with programme code being stored on a machine readable medium or embodied as an electromagnetic wave, the programme code being configured to execute the steps: providing a target simulation-model corresponding to a target Computer Aided Design (CAD)-model, based on a measurement of an actual produced part, providing a numerical representation of the actual produced part, wherein the actual produced part is produced based on the target CAD-model, generating an actual simulation-model corresponding to the actual produced part by modifying the target simulation-model such that the shape of the target simulation-model adapts to the numerical representation of the actual produced part. The target CAD-model corresponding to the target produced part may be generated at first as an additional step within the programme code.

With respect to the programme code of the computer program product, the numerical representation of the actual produced part may be a three-dimensional point cloud or a three-dimensional model based on a point cloud.

With respect to the programme code of the computer program product, generating the actual simulation-model may comprise matching the target simulation-model with the numerical representation of the actual produced part by minimising deviations between the target simulation-model and the numerical representation of the actual produced part. Minimising the deviations may be based on the least squares method.

With respect to the programme code of the computer program product, the target simulation-model may e.g. be a Finite Element (FE)-mesh comprising a set of vertices, and generating the actual simulation-model may comprise fitting the vertices of the target simulation-model such that every vertex lays within the numerical representation of the actual produced part.

With respect to the programme code of the computer program product, generating the actual simulation-model may comprise fitting the target simulation-model such that it becomes congruent with the numerical representation of the actual produced part.

With respect to the programme code of the computer program product, generating the actual simulation-model may comprise smoothing the fitted target simulation-model based on interpolations.

BRIEF DESCRIPTION OF THE DRAWINGS

In the following, the invention will be described in detail by referring to exemplary embodiments that are accompanied by figures, in which.

DETAILED DESCRIPTION

FIGS. 1*a*, 1*b*, 1*c*, and 1*d* show an embodiment of the inventive method or computer programme product.

Figure 1A:
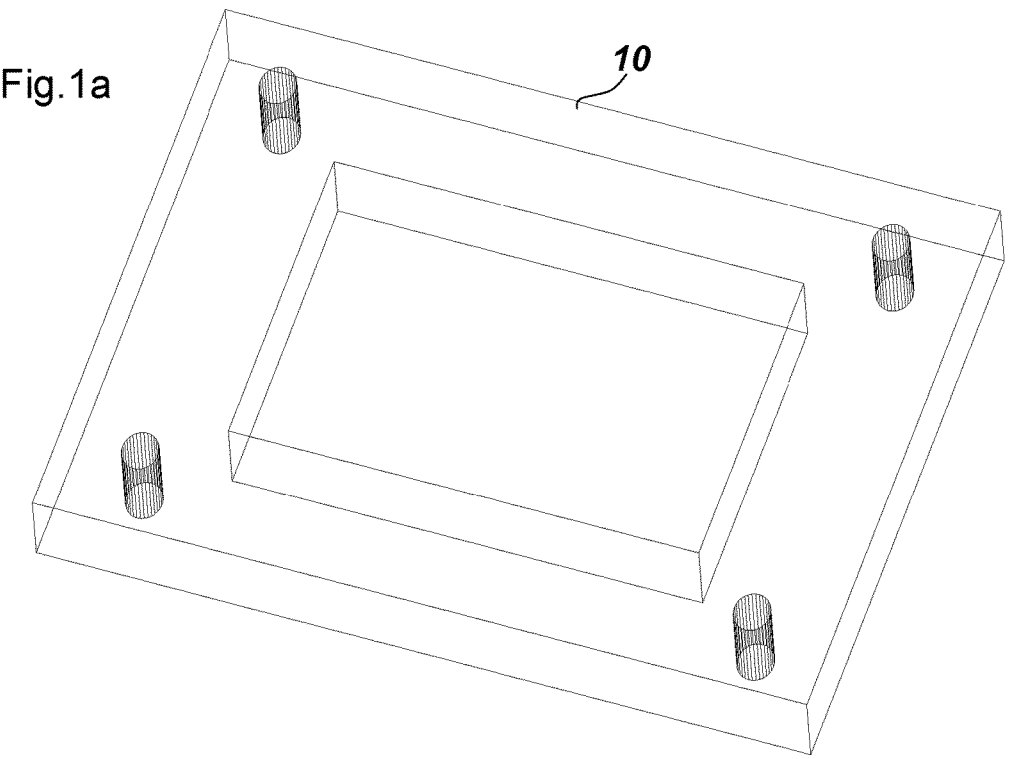
FIG. 1*a-d*: show one embodiment of the inventive method or computer programme product.

FIG. 1*a* shows a provided simulation-model 10 of a part as it is targeted to be produced, i.e. a target simulation-model. Such simulation-models are usually provided by a numerical simulation (software) by processing a Computer Aided Design (CAD)-model of a target part.

Figure 1B:
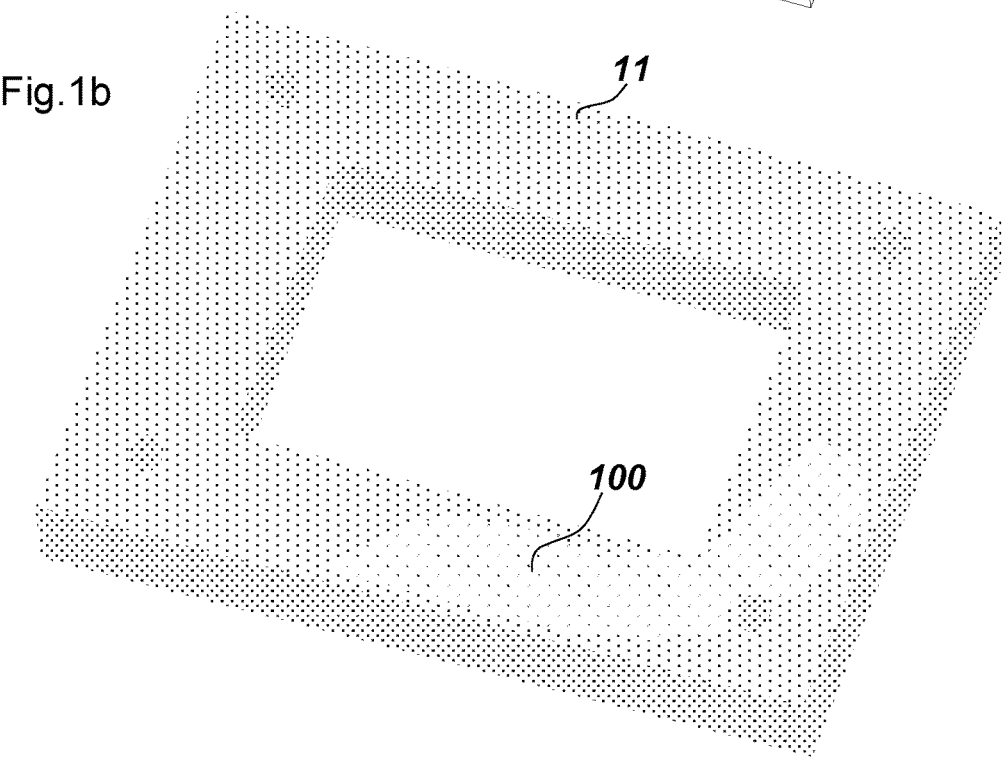

FIG. 1*b* shows a three-dimensional point cloud as a numerical representation 11 of a part as it has been actually produced. Such point clouds may in some places 100 be imperfect and/or incomplete, which makes them rather unsuitable for being the basis for creating a simulation-model directly out of them.

Figure 1C:
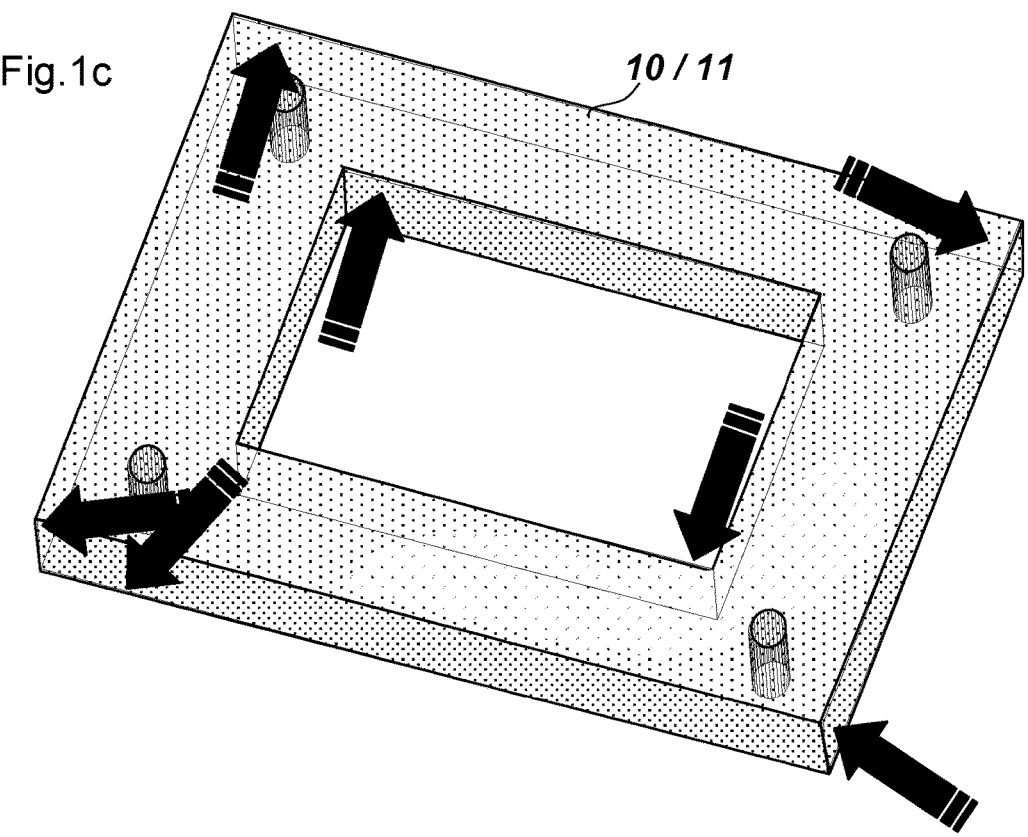
Figure 1D:
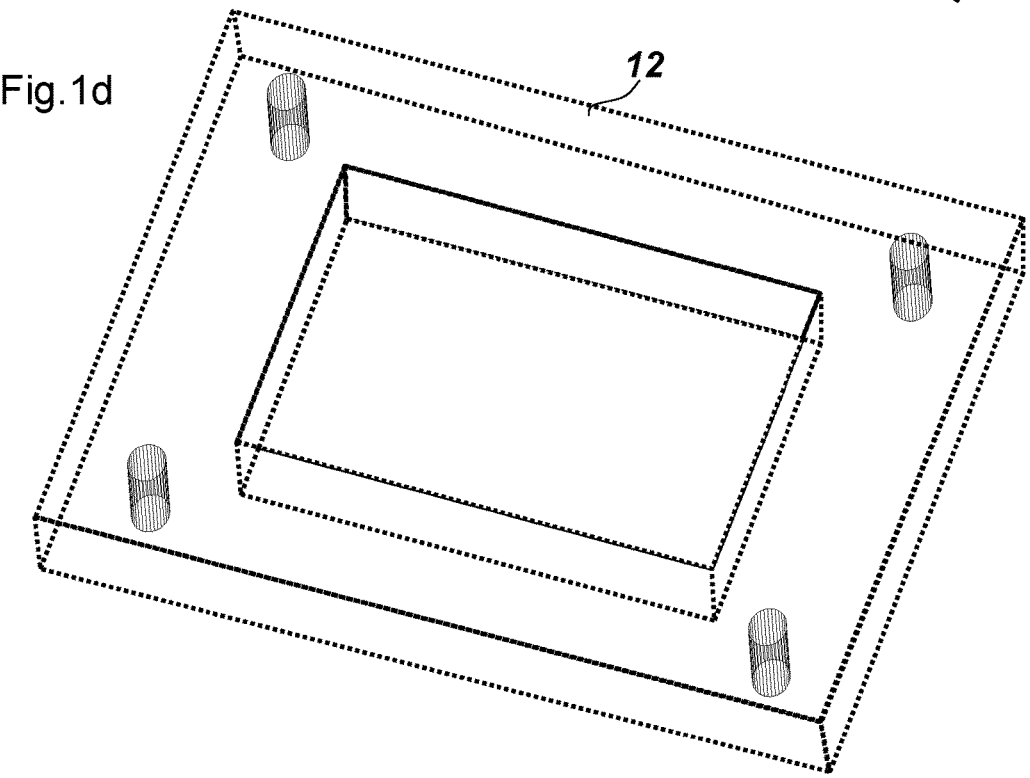

FIG. 1*c* shows the target simulation-model 10 and the numerical representation 11 in a matched position. Since the actual part usually deviates from the target part, these deviations are eliminated by reshaping (black arrows) the target simulation model 10, which becomes the actual simulation-model 12 (FIG. 1*d*) once convergence has been reached.

Figure 2A:
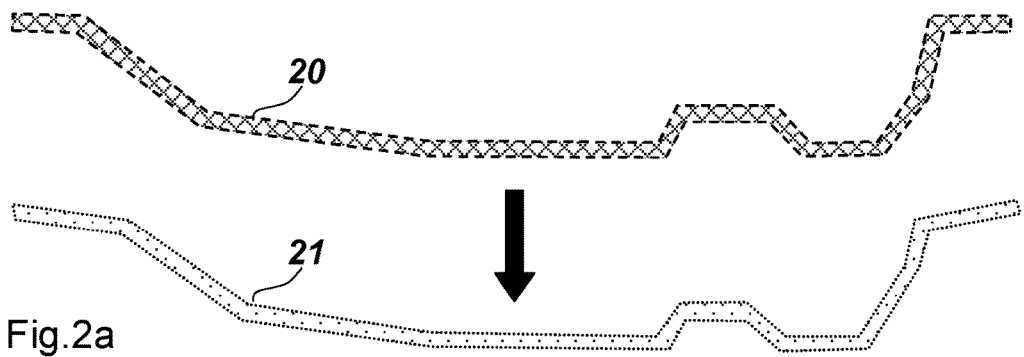
FIG. 2*a-c*: show a second embodiment of the inventive method or computer programme product.
Figure 2B:
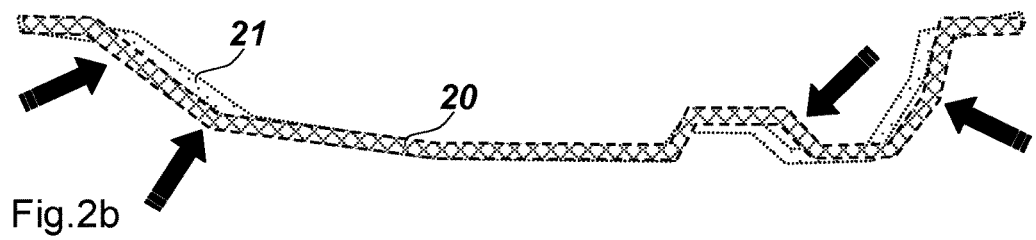
Figure 2C:
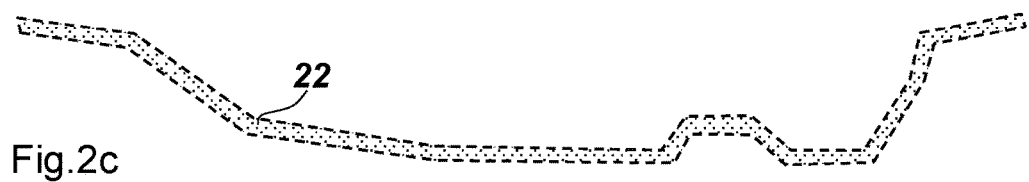

FIGS. 2*a*, 2*b*, and 2*c* abstractly show a further embodiment of the inventive method or computer programme product using the example of thin metal sheet. Sheet metal parts are produced by suppliers all over the world and these parts must be shipped to the assembly factory to be checked. When there are defects found, the parts are returned to the supplier along with detailed information regarding the defects, so corrections can be made. Sometimes the parts are not returned but only the corrective data. The logistics of shipping parts back and forth during the pre-production stages often add to delays in the entry into full production.

Therefore, a simulation-model corresponding to an actually produced part can also improve the supply chain by allowing for a virtual inspection of an actual produced part with regard to its mechanic behaviour.

FIGS. 2*a*, 2*b*, and 2*c*, show the generation of an actual simulation-model 22 based on a numerical representation 21 of an actual formed part. The part models are shown here in a cross-sectional view and are shaded symbolically: the meshed filling and dashed outline indicate an FE-mesh as target simulation-model 20, and the dots indicate a 3D point cloud as numerical representation 21.

Since thin metal sheet is very easy to deflect due to gravity, when generating the point cloud of the actual produced part, effects from gravity can be taken into account. For example, effects of gravity (bending or torsion) which are appearing during the measurement may be added (included), removed (excluded), or reversed (inverted). As well, the way the part is mounted during the measurement can be taken into account.

The target simulation-model 20 may have been generated by a numerical simulation, such as e.g. FE-analysis software. Usually, such target simulation-models are generated based on CAD-models of a desired (target) formed part, and then may be used in a numerical simulation for determining a tool surface which is needed to form the target formed part.

In case the target simulation-model 20 is embodied as a meshed FE-model, it may have a plurality of vertices (also known as nodes), which are the edges of the Finite Elements. By the shape formed by the elements/vertices, the target simulation-model 20 represents the shape of the target formed part.

This target shape may now be fitted to the numerical representation 21 of the actual formed part, which is indicated by the black arrows. The numerical representation may be a three-dimensional point cloud. Such a point cloud may for example be the outcome of a white light scan, blue light scan, laser scan or tactile measurement.

Several different numerical representations of the same part may be generated and be averaged. As well, numerical representations may be generated for several different parts actually formed with the same tool, and be averaged. Furthermore, from numerical representations of several different parts formed with the same tool, several different actual simulation-models may be generated according to the invention, and said several different actual simulation-models may be averaged.

The target simulation-model 20 is modified until the shape of the numerical representation 21 of the actual formed part is reached, or reached in best possible approximation within given tolerances.

This modification may comprise shaping the target simulation-model 20, or in particular, in case the simulation-model is embodied as FE-mesh, shifting vertices of the target FE-mesh 20 such that they best match the numerical representation. When the form of the point cloud 21 is reached (or reached in best approximation), the now modified (formerly: target) simulation-model becomes the actual simulation-model 22. This results in a clean simulation-model representing the actual formed part.

FIGS. 3a, 3b, 3c, and 3d show a further embodiment of the inventive method or computer programme product.

Figure 3A:
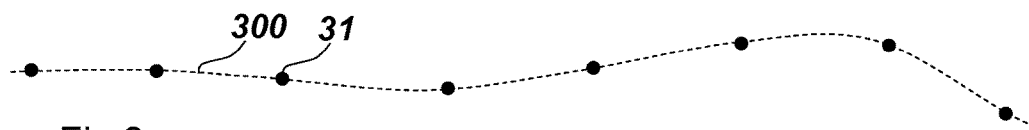
FIG. 3*a-d*: show a third embodiment of the inventive method or computer programme product.

A three-dimensional point cloud 31 as numerical representation of the actual produced part 300 is recorded by three-dimensionally measuring the actual produced part (FIG. 3a).

Figure 3B:
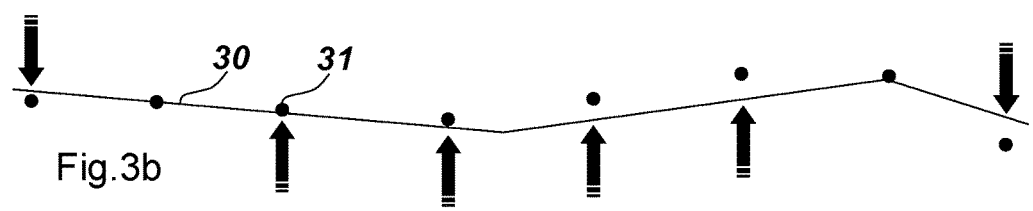

An ideal target simulation-model 30 corresponding to an ideal produced part is then matched with the point cloud 31, such that the target simulation-model aligns to the shape of the point cloud in a best possible approximation, e.g. by use of the least squares method or other approximation algorithms (FIG. 3b).

Figure 3C:
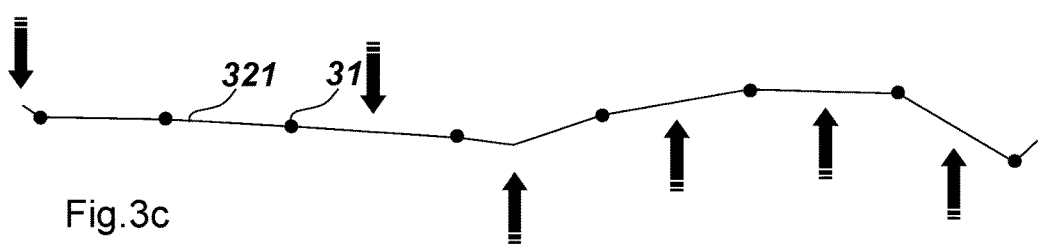

Indicated by the arrows in FIG. 3b, the shape of the simulation-model may be morphed in a way to conform with the numerical representation 31 of the actual part as it was produced (FIG. 3c). This results in an actual simulation-model 321.

Figure 3D:

Indicated by the arrows in FIG. 3c, the simulation-model may further be smoothed by known mathematical methods, such as the use of interpolations (FIG. 3d). This results in an actual simulation-model 322.

When the numerical simulation generates the target simulation-model based on a CAD-model of the target produced part, parameters regarding mechanics of materials are calculated and stored in the target simulation-model (e.g. in vertices, finite elements, or coordinates). These parameters are maintained when the target simulation-model is transformed to the actual simulation-model. Such parameters may describe manufacturing effects like work hardening, strain hardening, change in material thickness, residual stresses.

Each part mentioned herein may be a single part, a subassembly, or an assembly. The invention is not only applicable to the exemplary parts described above, but also applicable to further parts, whether made of solid material, hollow material or sheet material.

Although the invention is illustrated above, partly with reference to some preferred embodiments, it must be understood that numerous modifications and combinations of different features of the embodiments can be made. All of these modifications lie within the scope of the appended claims.

What is claimed is:

1. A method for generating a simulation-model corresponding to an actual produced part, the method comprising:
producing an actual produced part based on a target Computer Aided Design (CAD)-model;
providing a target simulation-model corresponding to the target Computer Aided Design (CAD)-model;
generating a numerical representation of the actual produced part based on a measurement of the actual produced part; and
generating an actual simulation-model by modifying the target simulation-model such that the shape of the target simulation-model adapts to the numerical representation of the actual produced part.

2. The method according to claim 1, wherein generating the numerical representation of the actual produced part comprises adding, removing, or reversing effects of gravity which the actual produced part is exposed to during the measurement.

3. The method according to claim 1, wherein the numerical representation of the actual produced part is a three-dimensional point cloud or a three-dimensional model based on a point cloud.

4. The method according to claim 1, wherein generating the actual simulation-model comprises:
matching the target simulation-model with the numerical representation of the actual produced part by minimising deviations between the target simulation-model and the numerical representation of the actual produced part.

5. The method according to claim 4, wherein minimising the deviations is based on the least squares method.

6. The method according to claim 1, wherein the target simulation-model is a Finite Element (FE)-mesh comprising a set of vertices, and wherein generating the actual simulation-model comprises:
fitting the vertices of the target simulation-model such that every vertex lays within the numerical representation of the actual produced part.

7. The method according to claim 1, wherein generating the actual simulation-model comprises:
fitting the target simulation-model such that it becomes congruent with the numerical representation of the actual produced part.

8. The method according to claim 6, wherein generating the actual simulation-model comprises smoothing the fitted target simulation-model based on interpolations.

9. A computer programme product with programme code being stored on a machine readable medium, the programme code being configured to execute a method comprising:
providing a target simulation-model corresponding to a target Computer Aided Design (CAD)-model;
providing a numerical representation of the actual produced part based on a measurement of an actual produced part, wherein the actual produced part is produced based on the target CAD-model; and
generating an actual simulation-model corresponding to the actual produced part by modifying the target simulation-model such that the shape of the target simulation-model adapts to the numerical representation of the actual produced part.

10. The computer programme product according to claim 9, further comprising:
generating the target CAD-model corresponding to the target produced part.

11. The computer programme product according to claim 9, wherein the numerical representation of the actual produced part is a three-dimensional point cloud or a three-dimensional model based on a point cloud.

12. The computer programme product according to claim 9, wherein generating the actual simulation-model comprises:
matching the target simulation-model with the numerical representation of the actual produced part by minimising deviations between the target simulation-model and the numerical representation of the actual produced part.

13. The computer programme product according to claim 9, wherein minimizing the deviations is based on the least squares method.

14. The computer programme product according to claim 9, wherein the target simulation-model is a Finite Element (FE)-mesh comprising a set of vertices, and
wherein generating the actual simulation-model comprises fitting the vertices of the target simulation-model such that every vertex lays within the numerical representation of the actual produced part.

15. The computer programme product according to claim 9, wherein generating the actual simulation-model comprises at least one of:
fitting the target simulation-model such that it becomes congruent with the numerical representation of the actual produced part, and
smoothing the fitted target simulation-model based on interpolations.

* * * * *